United States Patent
Samal et al.

(10) Patent No.: US 9,798,091 B2
(45) Date of Patent: Oct. 24, 2017

(54) FIBER OPTIC CONNECTOR WITH FIBER END PROTECTION

(71) Applicant: TYCO ELECTRONICS RAYCHEM BVBA, Kessel-Lo (BE)

(72) Inventors: Sangram Keshari Samal, Orissa (IN); Mamoni Dash, Orissa (IN); Peter Martha Dubruel, Oudenaarde (BE); Jan Watte, Grimbergen (BE); Stefano Beri, Zaventem (BE); Ceren Ozdilek, Leuven (BE); Walter Mattheus, B-Wijgmaal (BE); Danny Willy August Verheyden, Gelrode (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 14/764,502

(22) PCT Filed: Jan. 29, 2014

(86) PCT No.: PCT/EP2014/051712
§ 371 (c)(1),
(2) Date: Jul. 29, 2015

(87) PCT Pub. No.: WO2014/118225
PCT Pub. Date: Aug. 7, 2014

(65) Prior Publication Data
US 2015/0378109 A1  Dec. 31, 2015

Related U.S. Application Data

(60) Provisional application No. 61/758,140, filed on Jan. 29, 2013, provisional application No. 61/885,844, filed on Oct. 2, 2013.

(51) Int. Cl.
G02B 6/38 (2006.01)

(52) U.S. Cl.
CPC ......... *G02B 6/3849* (2013.01); *G02B 6/3809* (2013.01); *G02B 6/3866* (2013.01)

(58) Field of Classification Search
CPC .................................................... G02B 6/3866
See application file for complete search history.

(56) References Cited

U.S. PATENT DOCUMENTS

| 4,102,561 A | 7/1978 | Hawk et al. |
|---|---|---|
| 4,708,432 A | 11/1987 | Berg |

(Continued)

FOREIGN PATENT DOCUMENTS

| GB | 2 300 978 | 11/1996 |
|---|---|---|
| JP | H03-175406 | 7/1991 |

(Continued)

OTHER PUBLICATIONS

International Search Report for International Application No. PCT/EP2014/051712 mailed Apr. 29, 2014 (3 pages).

(Continued)

*Primary Examiner* — Michelle R Connelly
(74) *Attorney, Agent, or Firm* — Merchant & Gould P.C.

(57) ABSTRACT

The present disclosure relates to a fiber optic connector including a connector body (122) having a front end and a rear end. A shutter (74) is mounted at the front end of the connector body (122). The shutter (74) is movable relative to the connector body (122) between an open position and a closed position. The fiber optic connector (69) includes an optical fiber (100) having an end face that is accessible at the front end of the connector body (122) when the shutter (74) is in the open position. The fiber optic connector (69) also includes a cleaning material (501) provided at an inner side of the shutter (74) that covers the end face of the optical fiber (100) when the shutter (74) is in the closed position.

25 Claims, 17 Drawing Sheets

(56) References Cited

U.S. PATENT DOCUMENTS

| | | | |
|---|---|---|---|
| 5,125,056 | A | 6/1992 | Hughes et al. |
| 5,202,949 | A | 4/1993 | Hileman et al. |
| 5,400,060 | A | 3/1995 | Carlotta |
| 5,694,506 | A | 12/1997 | Kobayashi et al. |
| 6,142,676 | A | 11/2000 | Lu |
| 6,516,131 | B1 | 2/2003 | Tullis |
| 6,547,444 | B2 | 4/2003 | Kiani |
| 6,623,174 | B2 | 9/2003 | Perko et al. |
| 6,678,442 | B2 | 1/2004 | Gall et al. |
| 6,779,931 | B2 | 8/2004 | Murata et al. |
| 6,986,607 | B2 | 1/2006 | Roth et al. |
| 7,641,397 | B2 | 1/2010 | Koreeda et al. |
| 7,824,109 | B2 | 11/2010 | Tanaka et al. |
| 7,985,461 | B2 | 7/2011 | Hashimoto et al. |
| 8,251,592 | B2 | 8/2012 | Wu |
| 8,985,864 | B2 | 3/2015 | Ott |
| 8,998,503 | B2 | 4/2015 | Barnette, Jr. et al. |
| 2005/0169583 | A1* | 8/2005 | Lu .................. G02B 6/3807 385/59 |
| 2005/0207708 | A1* | 9/2005 | Wittrisch ........... G02B 6/3825 385/55 |
| 2007/0230874 | A1 | 10/2007 | Lin |
| 2008/0253719 | A1 | 10/2008 | Kachmar |
| 2008/0273842 | A1* | 11/2008 | Tanaka ............... G02B 6/3849 385/90 |
| 2009/0238522 | A1 | 9/2009 | Kachmar |
| 2011/0229078 | A1* | 9/2011 | Isenhour ............. G02B 6/3817 385/33 |
| 2011/0229088 | A1 | 9/2011 | Isenhour et al. |
| 2011/0229094 | A1* | 9/2011 | Isenhour ............. G02B 6/3825 385/92 |
| 2012/0033916 | A1* | 2/2012 | Lagathu .............. G02B 6/3816 385/59 |
| 2012/0141071 | A1 | 6/2012 | Duis et al. |
| 2012/0257859 | A1 | 10/2012 | Nhep |
| 2012/0328247 | A1 | 12/2012 | Kachmar |
| 2014/0072265 | A1* | 3/2014 | Ott ..................... G02B 6/4429 385/87 |
| 2014/0124140 | A1 | 5/2014 | Verheyden et al. |
| 2014/0254988 | A1 | 9/2014 | Nhep |
| 2014/0341511 | A1 | 11/2014 | Daems et al. |
| 2015/0063759 | A1 | 3/2015 | Barnette, Jr. et al. |
| 2015/0253518 | A1 | 9/2015 | Kachmar |
| 2016/0018604 | A1 | 1/2016 | Gurreri |
| 2016/0178850 | A1 | 6/2016 | Nhep |

FOREIGN PATENT DOCUMENTS

| | | |
|---|---|---|
| JP | 8-211235 | 8/1996 |
| JP | 2000-304949 | 11/2000 |
| JP | 2005-202224 | 7/2005 |
| WO | WO 83/00935 | 3/1983 |
| WO | WO 2011/047002 | 4/2011 |
| WO | WO 2012/112343 | 8/2012 |

OTHER PUBLICATIONS

International Search Report for International Application No. PCT/EP2014/051711 mailed Mar. 24, 2014 (2 pages).

NTTAT Integrated Value Provider—Free Bending Optical Cord. http://www.ntt-at.com/product/fboc-copyright2000-2013. Known prior art.

U.S. Appl. No. 14/377,189, filed Aug. 7, 2014 entitled: Optical Fiber Connection System Including Optical Fiber Alignment Device.

* cited by examiner

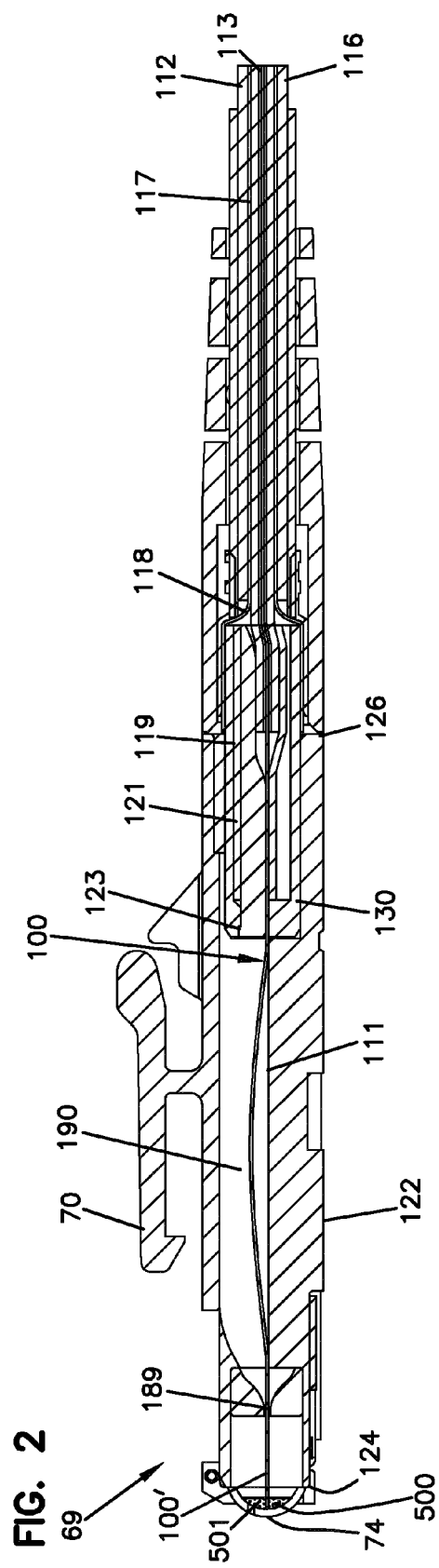

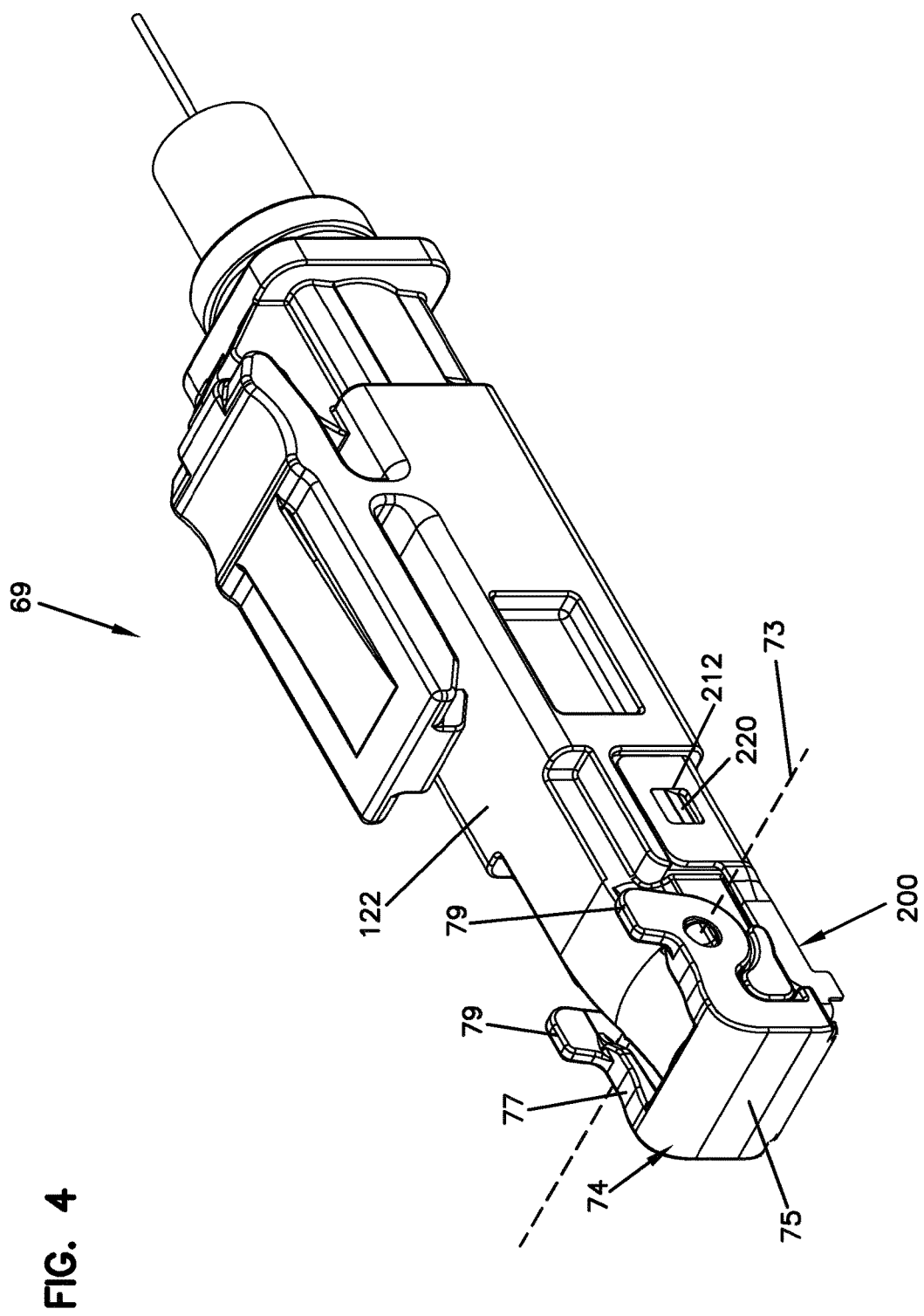

FIBER OPTIC CONNECTOR WITH FIBER END PROTECTION

This application is a National Stage Application of PCT/EP2014/051712, filed 29 January 2014, which claims benefit of U.S. Provisional Ser. No. 61/758,140, filed 29 Jan. 2013 and U.S. Provisional Ser. No. 61/885,844, filed 2 Oct. 2013 and which applications are incorporated herein by reference. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. A removable dust cap is often mounted over the ferrule to protect the polished end face of the optical fiber from damage and/or contamination. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

U.S. Pat. Nos. 5,883,995 and 6,142,676 disclose a ferrule-less fiber optic connector having an optical fiber having a ferrule-less end portion that is accessible at a front end of a connector body of the fiber optic connector. The fiber optic connector includes a shutter pivotally mounted at the front end of the connector body. The shutter is pivotally movable between an open position where the ferrule-less end portion of the optical fiber is exposed and a closed position where the ferrule-less end portion of the optical fiber is covered by the shutter.

While structures such as shutters and dust caps have been used in the prior art to protect the polished end faces of optical fibers, improvements are needed in this area.

SUMMARY

One aspect of the present disclosure relates to a fiber optic connector having features that protect the end face of an optical fiber from damage and contamination. Another aspect of the present disclosure relates to a fiber optic connector having features that inhibit contamination of a clean end face of an optical fiber. Another aspect of the present disclosure relates to a fiber optic connector having features that clean the end face of an optical fiber. A further aspect of the present disclosure relates to fiber optic connectors that incorporate gel or other fluid to clean and/or protect the end faces of optical fibers.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 2 illustrates a fiber optic connector in a non-connected state;

FIG. 3 illustrates the fiber optic connector of FIG. 2 in a connected state;

FIG. 4 is a front, top, perspective view of the fiber optic connector of FIG. 2 with a shutter of the fiber optic connector in a closed position;

DETAILED DESCRIPTION

Figure 1:
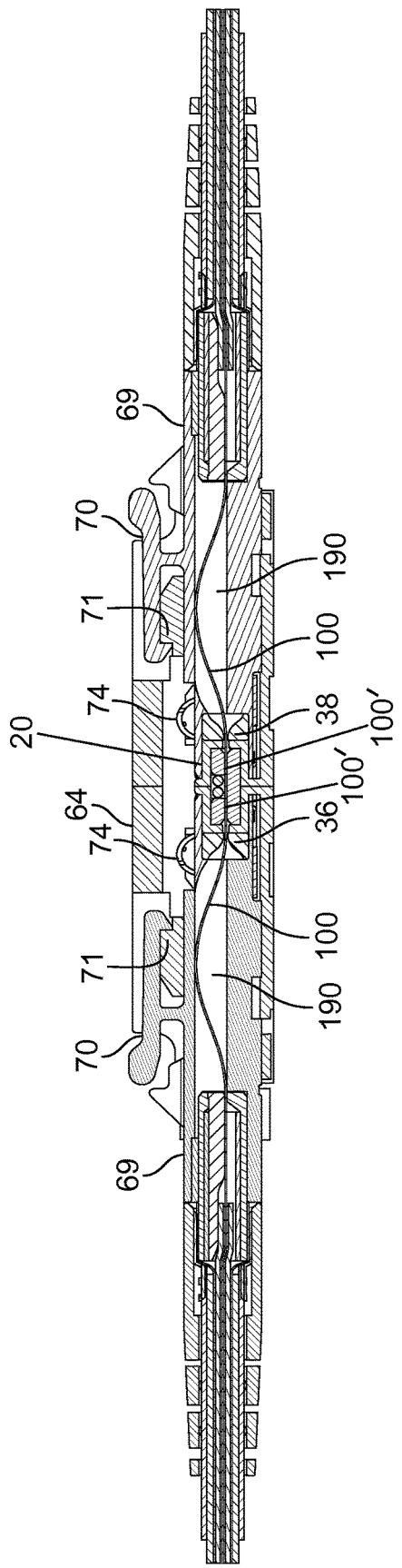
FIG. 1 shows a fiber optic adapter with fiber optic connectors inserted therein.

FIG. 1 shows the simplex fiber optic adapter 64 being used to optically and mechanically couple two fiber optic connectors 69. In one example, the fiber optic connectors 69 can have an LP-connector type footprint/profile/shape. The fiber optic connectors 69 include latches 70 (e.g., resilient cantilever style latches) that engage catches 71 of the fiber optic adapter 64. When the fiber optic connectors 69 are inserted within coaxially aligned ports of the fiber optic adapter 64, shutters 74 (see FIG. 20) of the fiber optic connectors 69 are retracted (see FIG. 21) thereby exposing ferrule-less free end portions 100' of the optical fibers 100 of the fiber optic connectors 69. Continued insertion of the fiber optic connectors 69 into the ports of the fiber optic adapter 64 causes the end portions 100' of the optical fibers 100 to enter an optical fiber alignment device 20 incorporated within the fiber optic adapter 64. The optical fibers 100 slide along an insertion axis 22 and are brought into registration (i.e., co-axial alignment) with one another. As the optical fibers 100 into the optical fiber alignment device, the optical fibers 100 displace corresponding balls 40, 41 against the bias of springs 44, 45. The optical fibers 100 slide along and an alignment groove 32 until end faces of the optical fibers 100 are optically coupled to one another. In this configuration, the springs 44, 45 and the balls 40, 41 function to clamp or otherwise retain the optical fibers 100 in the optically coupled orientation.

The embodiments disclosed herein can utilize a dimensionally recoverable article such as a heat-recoverable tube/sleeve for securing/locking optical fibers at desired locations within the connector bodies and for attaching cable jackets and cable strength members to the connectors. A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been cross-linked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments, the heat-recoverable article is a sleeve or a tube that can include a longitudinal seam or can be seamless. In certain embodiments, the tube has a dual wall construction including an outer, heat-recoverable annular layer, and an inner annular adhesive layer. In certain embodiments, the inner annular adhesive layer includes a hot-melt adhesive layer.

In one embodiment, the heat-recoverable tube is initially expanded from a normal, dimensionally stable diameter to a dimensionally heat unstable diameter that is larger than the normal diameter. The heat-recoverable tube is shape-set to the dimensionally heat unstable diameter. This typically occurs in a factory/manufacturing setting. The dimensionally heat unstable diameter is sized to allow the heat-recoverable tube to be inserted over two components desired to be coupled together. After insertion over the two components, the tube is heated thereby causing the tube to shrink back toward the normal diameter such that the tube radially compresses against the two components to secure the two components together. The adhesive layer is preferably heat activated during heating of the tube.

According to one embodiment, the heat-recoverable tube may be formed from RPPM material that deforms to a dimensionally heat stable diameter generally at around 80° C. RPPM is a flexible, heat-shrinkable dual wall tubing with an integrally bonded meltable adhesive liner manufactured by Raychem. According to another embodiment, the heat-recoverable tube 56 may be formed from HTAT material that deforms to a dimensionally heat stable diameter generally at around 110° C. HTAT is a semi-flexible, heat-shrinkable tubing with an integrally bonded meltable adhesive inner lining designed to provide moisture proof encapsulation for a range of substrates, at elevated temperatures. HTAT is manufactured by Raychem from radiation cross-linked poly-olefins. The inner wall is designed to melt when heated and is forced into interstices by the shrinking of the outer wall, so that when cooled, the substrate is encapsulated by a protective, moisture proof barrier. According to one embodiment, the heat-recoverable tube may have a 4/1 shrink ratio between the dimensionally heat unstable diameter and the normal dimensionally heat stable diameter.

Referring to FIGS. 2 and 3, the fiber optic connector 69 is part of a fiber optic assembly that includes a fiber optic cable 112 terminated to the fiber optic connector 69. The fiber optic cable 112 includes the optical fiber 100 and an outer jacket 116. In certain implementations, the fiber optic cable 112 includes a strength layer 118 positioned between the fiber 100 and the outer jacket 116. In certain implementations, the fiber optic cable 112 includes a buffer tube 117 (e.g., a buffer layer having an outer diameter ranging from 600-1000 microns) that surrounds the optical fiber 100. The optical fiber 100 can also include a coating layer 113 that surrounds a bare glass portion 111. In one example, the coating layer 113 can have an outer diameter ranging from 230-270 microns and the bare glass portion 111 can have a cladding layer having an outer diameter ranging from 120-130 microns and a core having a diameter ranging from 5-15 micron. In an example, the optical fiber 100 has a diameter of about 250 microns. Other examples can have different dimensions. The strength layer 118 can provide tensile reinforcement to the cable 112 and can include strength members such as reinforcing aramid yarns.

The fiber optic connector 69 includes a main connector body 122 having a front mating end 124 and a rear cable terminating end 126. An electrically conductive (e.g., metal) rear insert 130 is secured (e.g., press fit within) the rear cable terminating end 126 of the connector body 122. The optical fiber 100 extends from the fiber optic cable 112 forwardly through the main connector body 122 and has a ferrule-less end portion 100' that is accessible at the front mating end 124 of the connector body 122. Adjacent the rear cable terminating end 126 of the connector body 122, the optical fiber 100 is fixed/anchored against axial movement relative to the connector body 122. For example, the optical fiber 100 can be secured to a fiber securement substrate 119 by a shape recoverable article 121 (e.g., a heat shrink sleeve having an inner layer of hot melt adhesive). The fiber securement substrate 119 can be anchored within the rear insert 130. The rear insert 130 can be heated to transfer heat to the shape recoverable article thereby causing the shape recoverable article 121 to move from an expanded configuration to a fiber retaining configuration (e.g., a compressed configuration). The shape recoverable article 121 and the fiber securement substrate 119 function to anchor the optical fiber 10 against axial movement relative to the connector body 122. Thus, when an optical connection is being made, optical fiber cannot be pushed from inside the connector body 122 back into the fiber optic cable 112.

A fiber buckling region 190 (i.e., a fiber take-up region) is defined within the connector body 122 between the fiber anchoring location at the rear of the connector body 122 and the front mating end 124 of the connector body 122. When two connectors 69 are coupled together within one of the adapters 64 (as shown at FIG. 1), the end faces of the ferrule-less end portions 100' of the optical fibers 100 abut one another thereby causing the optical fibers 100 to be forced rearwardly into the connector bodies 122. As the optical fibers 100 are forced rearwardly into the connector bodies 122, the optical fibers 100 buckle/bend within the fiber buckling regions 190 (see FIGS. 1, 3 and 14) since the fiber anchoring location prevents the optical fiber 100 from being pushed back into the optical cable 112. The fiber buckling regions 190 are designed so that minimum bend radius requirements of the optical fibers 100 are not violated. In one example, the fiber buckling regions 190 are sized to accommodate at least 0.5 millimeters or at least 1.0 millimeters of rearward axial movement of the optical fibers 100, 102. In one embodiment, the fiber buckling regions 190 have lengths from 15-25 millimeters. Fiber alignment structures 189 can be provided at the front mating ends 124 of the connectors 69 for providing rough alignment of the ferrule-less end portions 100' along insertion axes of the connectors 69. In this way, the ferrule-less end portions 100' are positioned to slide into the alignment device 20 when the connectors 69 are inserted into a fiber optic adapter 64.

Referring again to FIGS. 2 and 3, the fiber securement substrate 119 can be loaded into the rear insert 130 through a front end of the rear insert 130. A front retention structure 123 (e.g., a flange, lip, tab or other structure) of the fiber securement substrate 119 can abut, mate with, interlock with or otherwise engage a front end of the insert 130. The rear insert 130 can be press fit within the rear end of the connector body. As used herein, the front end of the connector is the mating end where the ferrule-less end portion 100' is accessible, and the rear end of the connector is the end where the cable is attached to the connector body.

Figure 5:
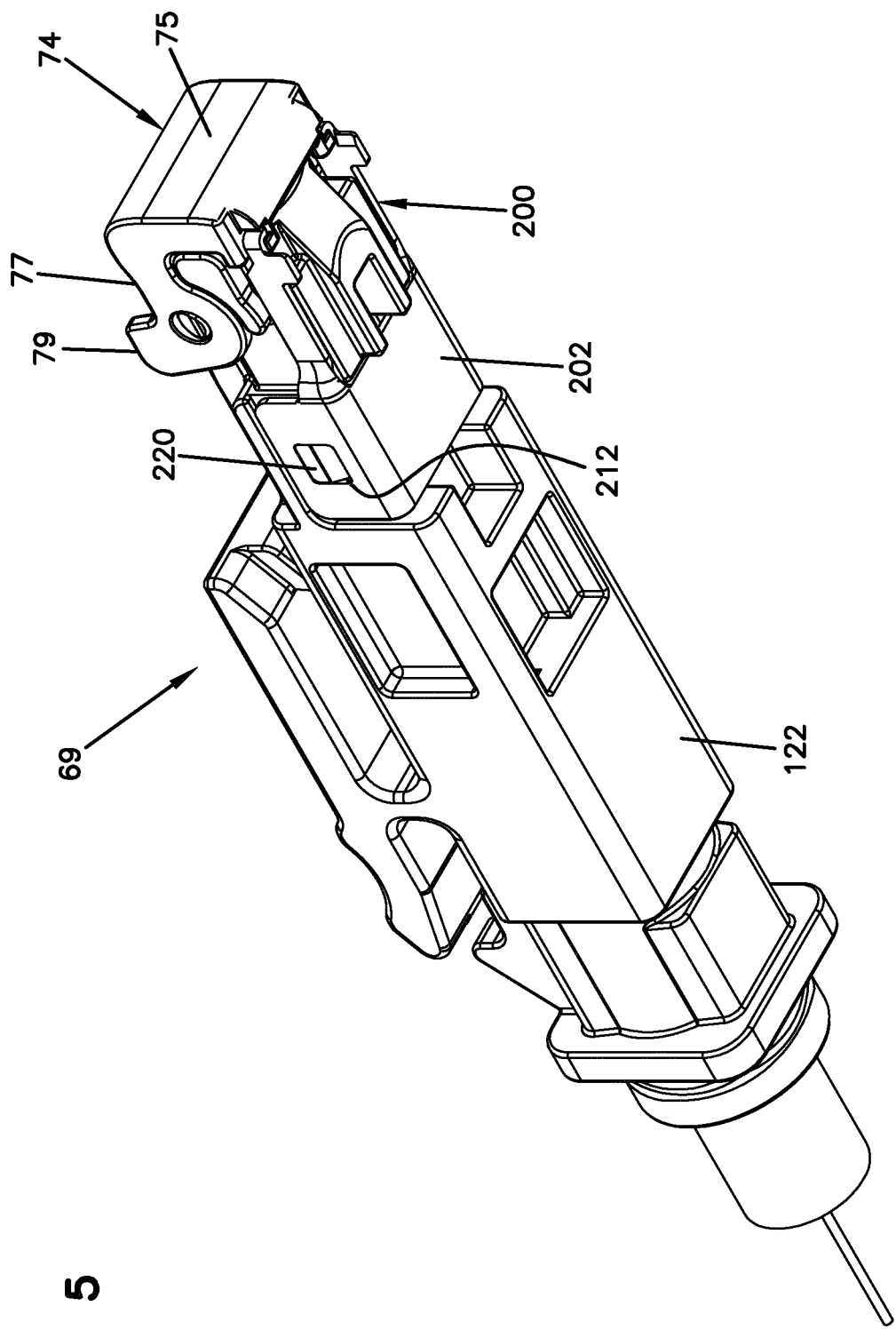
FIG. 5 is a front, bottom, perspective view of the fiber optic connector of FIG. 4 with the shutter in the closed position.
Figure 6:
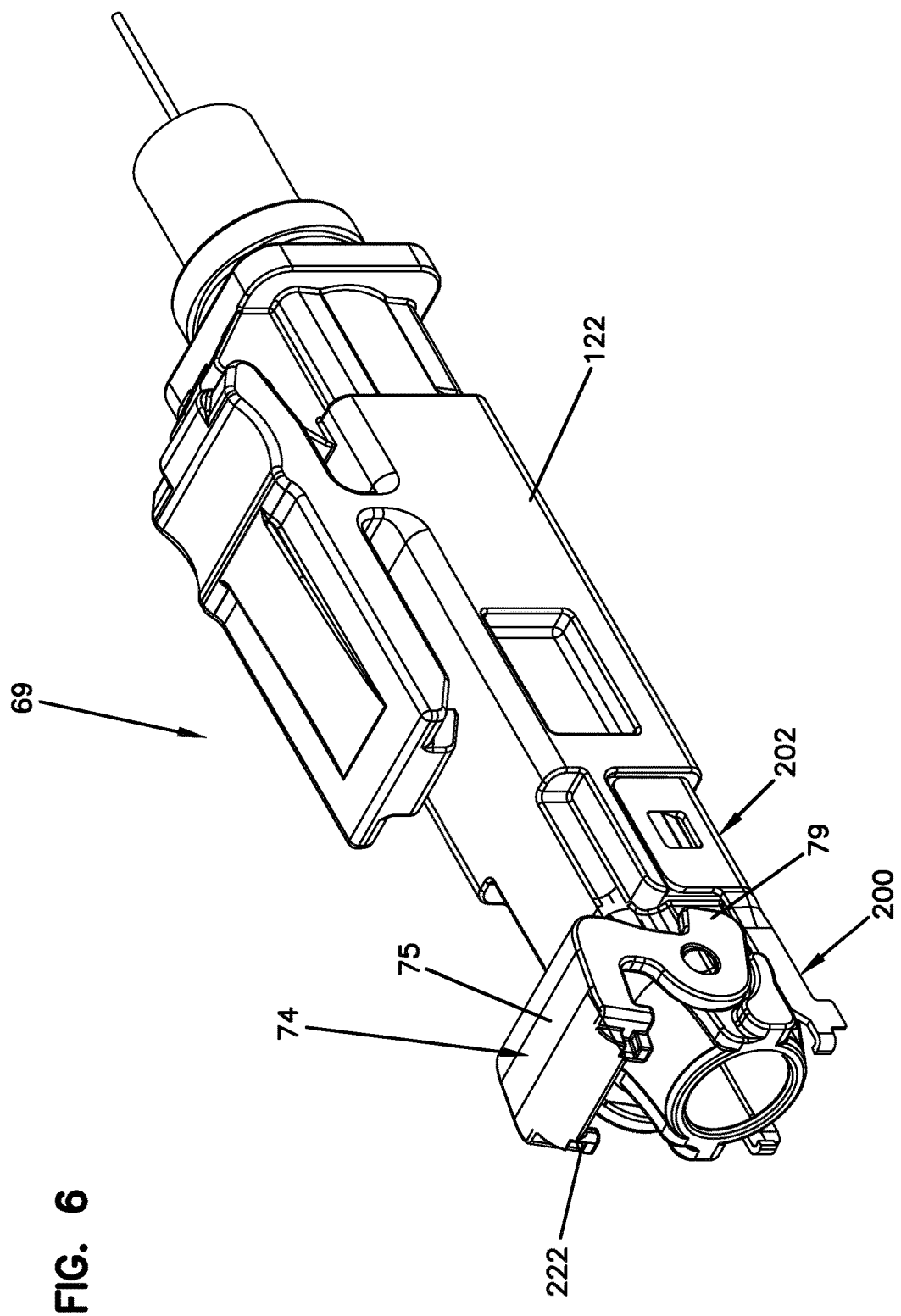
FIG. 6 is a front, top, perspective view of the fiber optic connector of FIG. 2 with a shutter of the fiber optic connector in an open position.
Figure 7:
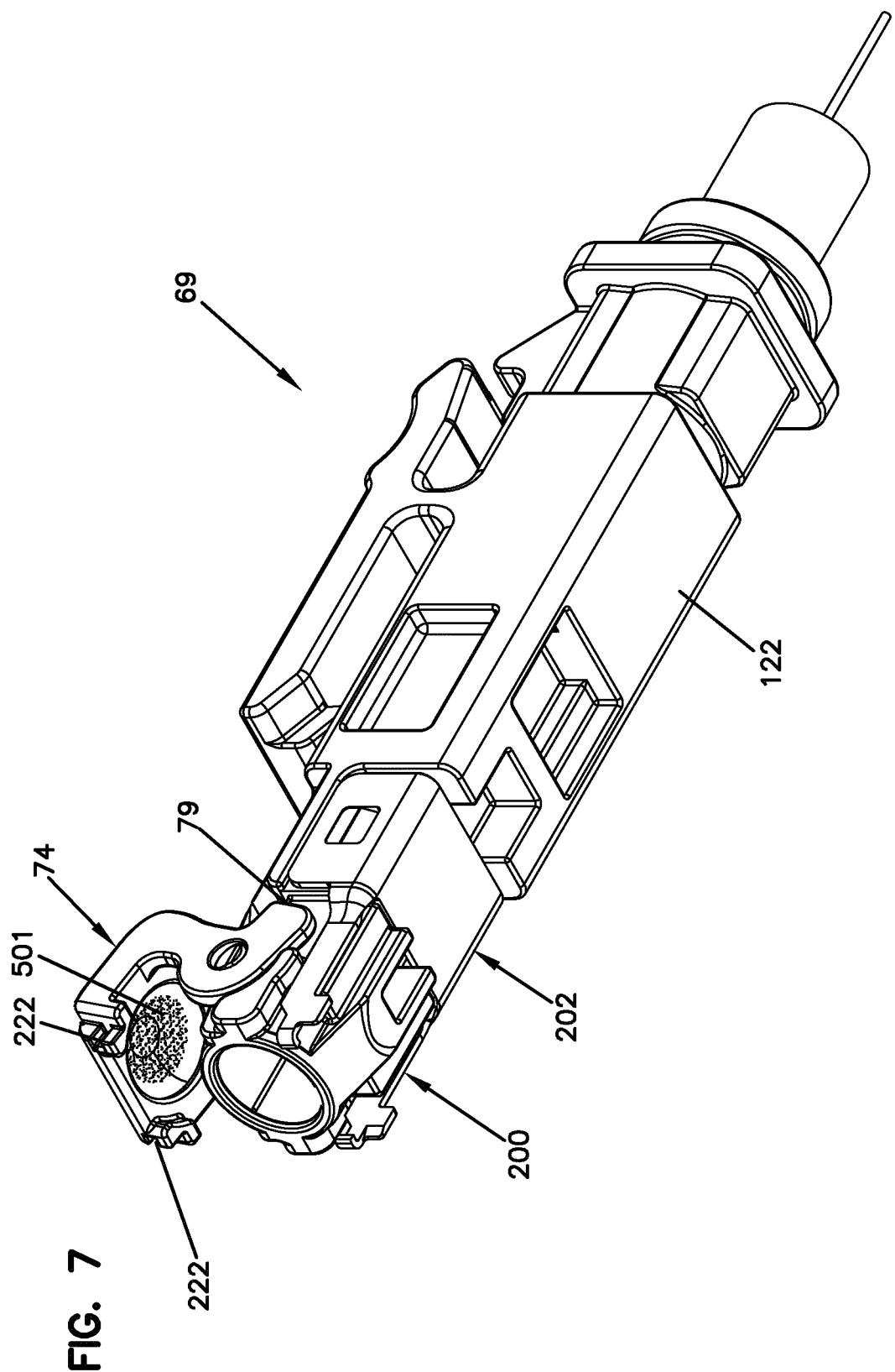
FIG. 7 is a front, bottom, perspective view of the fiber optic connector of FIG. 4 with the shutter in the open position.

The shutter 74 of the fiber optic connector 69 is movable between a closed position (see FIGS. 4 and 5) and an open position (see FIGS. 6 and 7). When the shutter 74 is in the closed position, the ferrule-less end portion 100' of the optical fibers 100 is protected from contamination. When the shutter 74 is in the open position, the ferrule-less end portion 100' is exposed and capable of being accessed for making an optical connection. The shutter 74 includes a front cover portion 75, a top portion 77 and a lever portion 79 that projects upwardly from the top portion 77. The shutter 74 pivots between the open and closed positions about a pivot axis 73.

Figure 8:
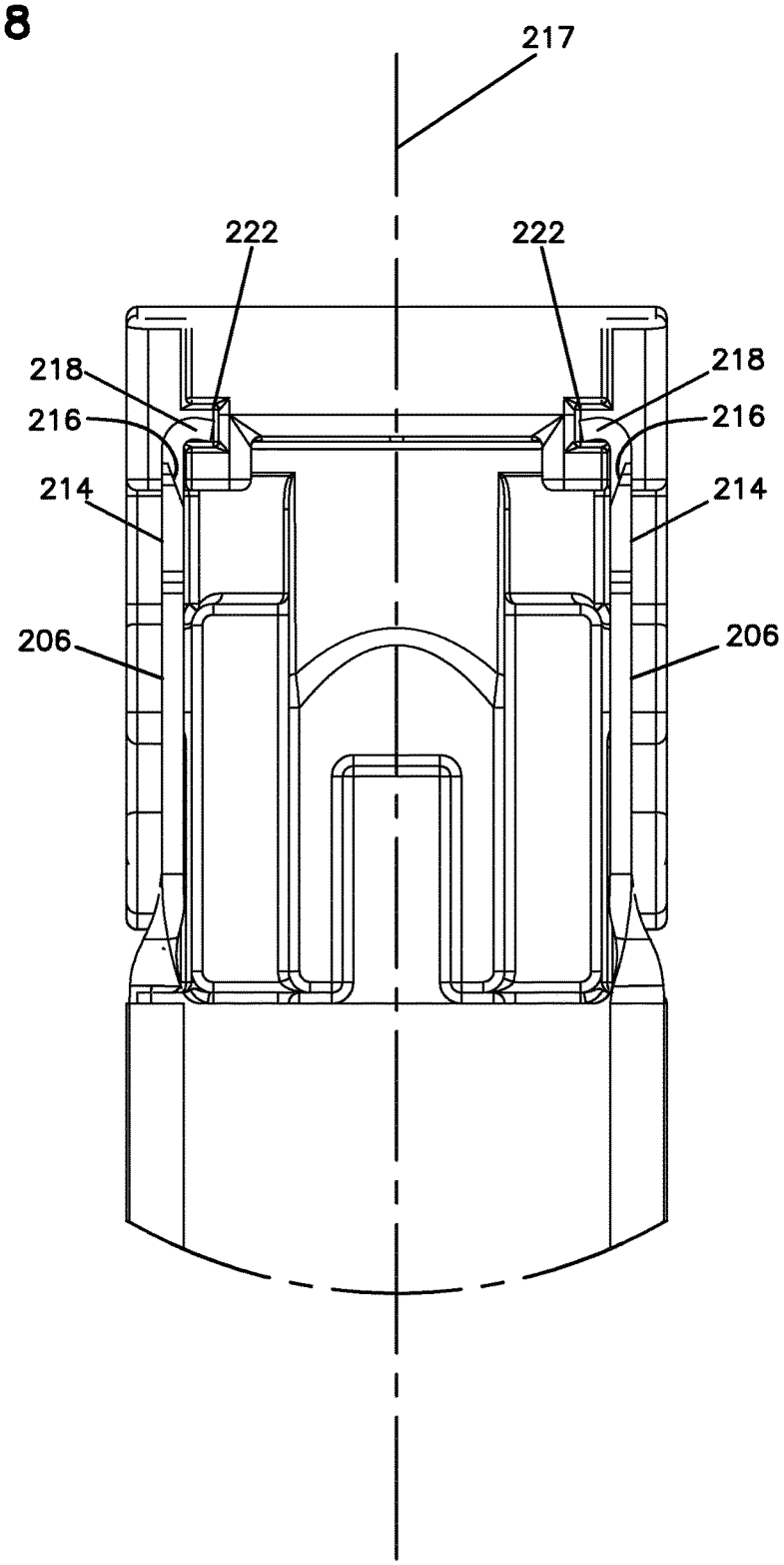
FIG. 8 is a bottom view of a front end of the fiber optic connector of FIG. 4 with a shutter latch mechanism in a latching position.
Figure 10:
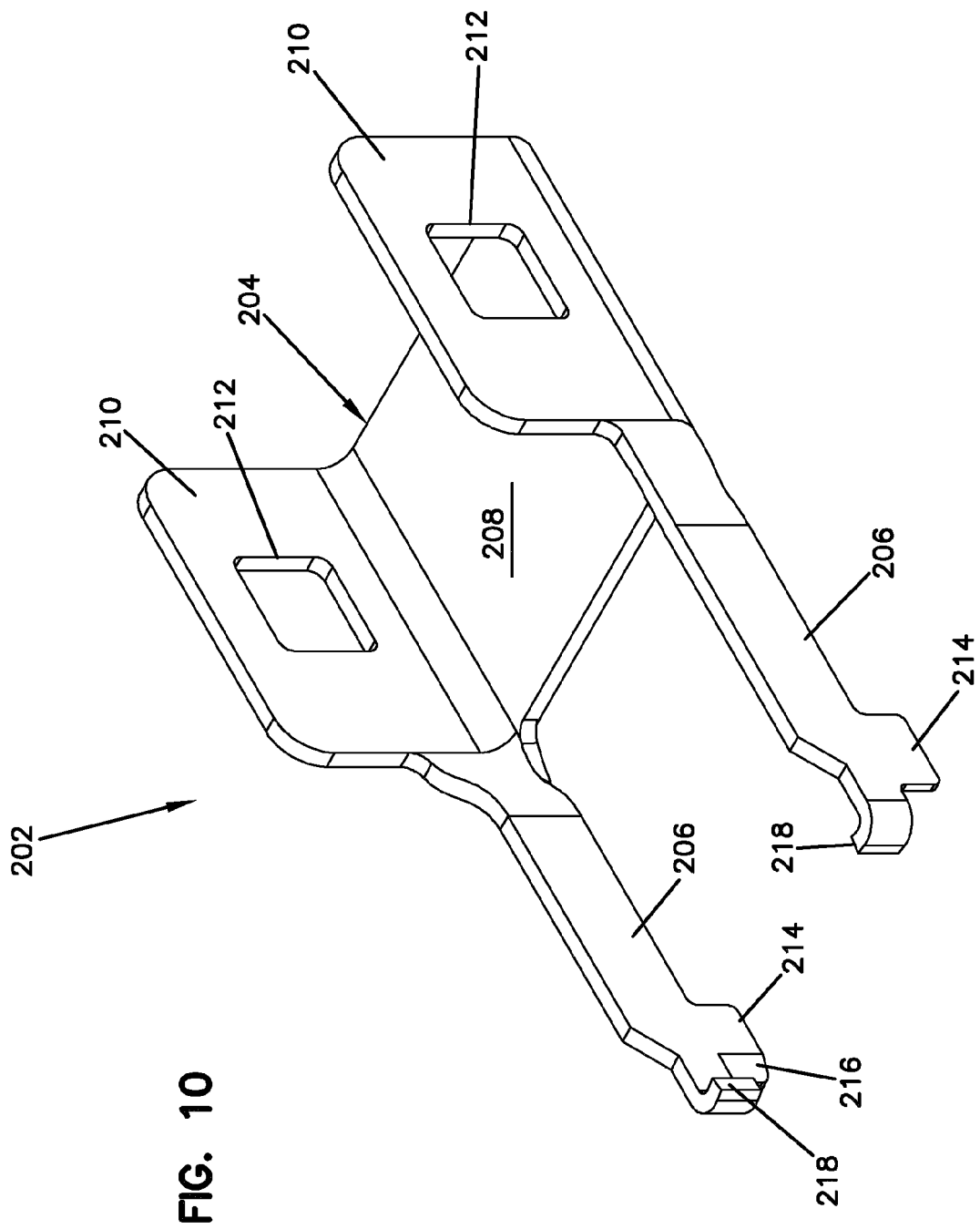
FIG. 10 is a perspective view of the shutter latch mechanism of the fiber optic connector of FIG. 4.

The fiber optic connector 69 includes a latching mechanism 200 that positively latches the shutter 74 in the closed position. The latching mechanism 200 can include a latching clip 202 that engages the shutter 74 to retain the shutter 74 in the closed position. As shown at FIG. 10, the latching clip 202 includes a main body 204 and two spaced-apart latching arms 206. The main body 204 includes a base 208 and two opposing side walls 210 that extend upwardly from the base 208. The side walls define openings 212. The latching arms 206 have a resilient, cantilevered configuration and project forwardly from the base 208. The latching arms 206 include downwardly projecting release tabs 214 having ramp surfaces 216. The latching arms 206 also include end hooks 218. The ramp surfaces 216 face generally towards each other (i.e., the ramp surfaces face toward a vertical reference plane 217 (see FIG. 8) that longitudinally bisects the connector body 122) and are angled to extend laterally outwardly as the ramp surfaces 216 extend in the connector insertion direction.

Figure 9:
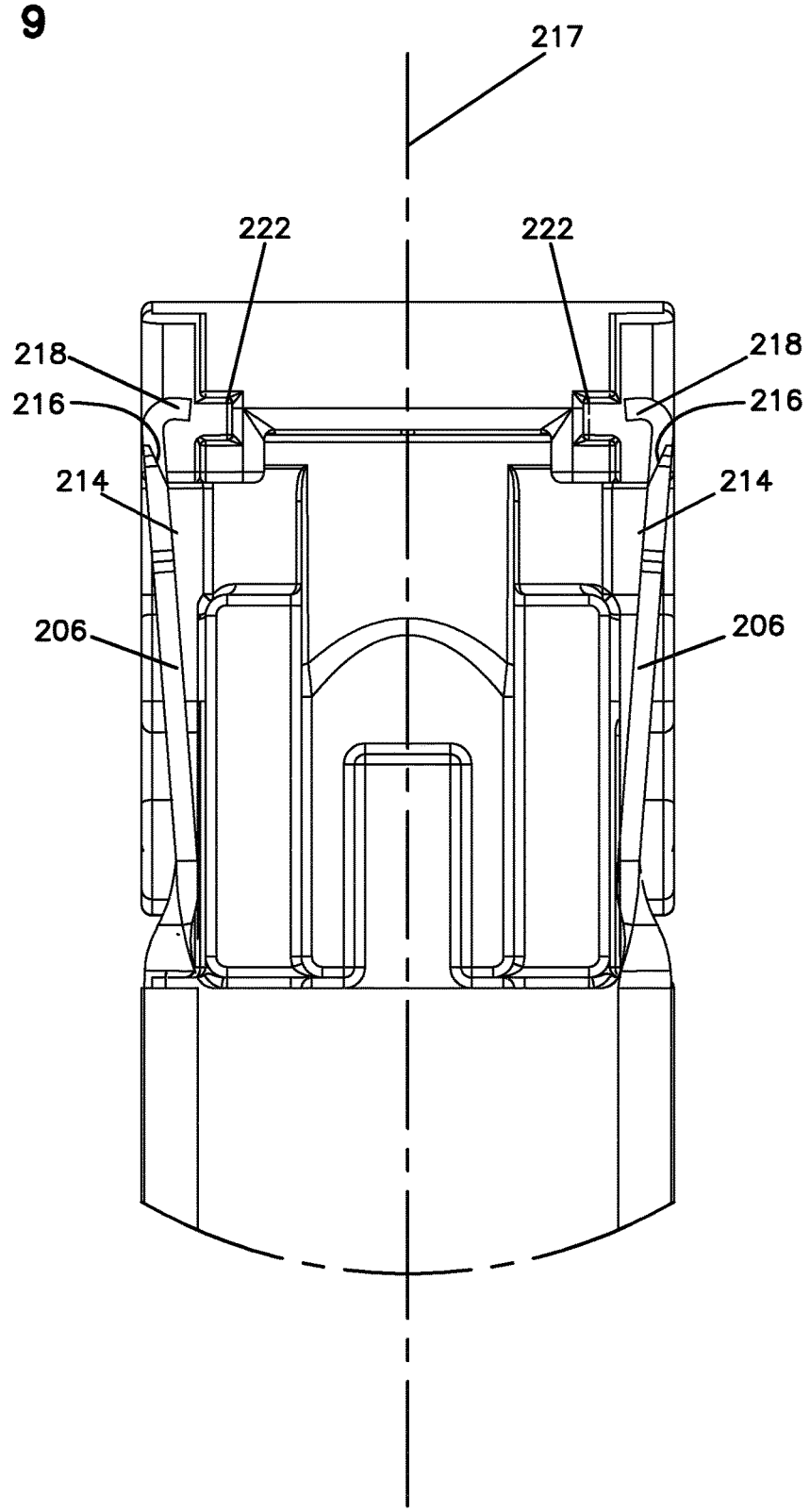
FIG. 9 is a bottom view of a front end of the fiber optic connector of FIG. 4 with the shutter latch mechanism in a release position.

The latching clip 202 is installed on the connector 69 by snapping the main body 204 onto the connector body 122. When the main body 204 is snapped in position, the side walls 210 straddle the sides of the connector body 122 and the base 208 is positioned beneath the underside of the connector body 122. The side walls 210 can flex to allow side tabs 220 of the connector body 122 to snap-fit into the openings 212 of the side walls 210. With the latching clip 202 is installed on the connector body 122, the latching arms 206 extend along opposite sides of the connector body 122 adjacent the bottom of the connector body 122. The release tabs 214 project downwardly below the bottom side of the connector body 122. The latching arms 206 are movable between a latching position (see FIG. 8) and a release position (see FIG. 9). When the latching arms 206 are in the latching position and the shutter 74 is in the closed position, the end hooks 218 of the latching arms 206 fit within receptacles 222 defined by the shutter 74 such that the latching arms 206 retain the shutter 74 in the closed position. Thus, the latching arms 206 prevent the shutter 74 from moving from the closed position to the open position. When the latching arms 206 are in the release position, the latching arms 206 are flexed laterally outwardly such that the end hooks 218 are outwardly displaced from the receptacles 222. In this way, the latching arms 206 do not interfere with movement of the shutter 74 and the shutter 74 is free to be moved from the closed position to the open position.

As shown at FIGS. 2 and 3, the inner side of the front cover portion 75 of the shutter 74 can include a receptacle 500 in which a cleaning material 501 is at least partially contained. In some implementations, a cleaning material 501 refers to a material that cleans a surface or surfaces. In other implementations, a cleaning material 501 refers to a material that inhibits contamination (e.g., particulate, liquid, other contaminants) of a surface or surfaces. In other implementations, a cleaning material 501 refers to a material that inhibits damage (e.g., scratches, abrasions, divots, or other breakage) to a surface or surfaces. In still other implementations, a cleaning material 501 refers to a material that cleans, inhibits contamination of, and/or inhibits damage to a surface or surfaces.

In some implementations, the cleaning material 501 is a volume of flowable protective material (e.g., gel). A gel is a material that is mostly liquid but behaves similar to a solid in some regards because of a three-dimensional cross-linked network within the liquid. In one example, the gel exhibits no flow in the steady-state. In one example, similar to a liquid, the gel is substantially incompressible. In one example, the gel will flow when subject to a force. In one example, the gel has non-stick adhesive properties such that no gel residue is left on an optical fiber once the optical fiber has been removed from the gel. In one example, the gel is sufficiently soft that an optical fiber (e.g., a 120-130 micron bare optical fiber or a 230-270 micron coated optical fiber) can penetrate into the gel. For example, the gel may have adhesive forces of 500N or higher. In certain examples, the gel may have adhesive forces of 600N or higher. In certain implementations, the gel may have a tack time of less than 0.5 seconds. In an example, the gel may have a tack time of less than 0.3 seconds. In one example, a compressive load remains on the optical fiber when the ferrule-less end portion 100' of the optical fiber 100 is stored/protected within the gel.

An example of a gel may include a silicone based formula, such as, but not limited to, poly-di-methylsiloxane (PDMS). PDMS is well known in the art as being a soft polymer with attractive physical and chemical properties: elasticity, optical transparency, flexible surface chemistry, low permeability to water, and low electrical conductivity. It is also well known in the art that PDMS gels can be produced by irradiation with accelerated electrons and is known to stick to all kinds of glass. Polydimethylsiloxane (PDMS) exhibits an extremely low glass transition temperature, Tg (−125° C.) which makes it a particularly effective soft segment. PDMS is comprised of inorganic siloxane backbone and exhibits a unique set of properties including biocompatibility, hydrophobicity, high gas permeability and good thermal and chemical stability. Polymers such as polycaprolactone (PCL) or polyethylene glycol mono methyl ether (PEO) or mixtures thereof may be added to the PDMS system. Any combination of these polymers may also be used.

In one example, PCL is added to the PDMS formula to help smoothen the gel and allow for better fiber penetration. PCL may also help better remove contaminants from a surface. The addition of PCL to PDMS may help to minimize the change of the gel properties (i.e. aging, T cycling). The combination of the properties of PCL and PDMS provides the co-polymers for employment as surface modifying additives in various applications. Example PDMS gels are available under the name 3-4222 Dielectric Firm Gel and 3-4241 Dielectric Tough Gel from Dow Corning®.

In other examples, the PDMS formula may include the addition of PEO to help enhance softness and cleaning ability. In one example, PEO is coupled to hydrophobic moieties of PDMS and can produce non-ionic surfactants to improve cleaning. In accordance with another aspect of the disclosure, the gel system may include a Polyurethane gel. In one example, the polymer hardness may be modified by changing the ratio between the isocyanate and the poly-ol.

In certain examples, the cleaning material 501 provides infrared protection by inhibiting light emerging from the fiber tip from passing through the shutter 74. In certain implementations, the cleaning material 501 inhibits damage to the shutter 74 from light emerging from the tip of the fiber 100. In certain examples, the gel cleaning material 501 also can include a modifying material that modifies the properties of the gel material. The modifying material can be added as nanoparticles, nanobeads, nanotubes, quantum dots, etc. In an example, fumed silica nanoparticles can be added to the gel material. The fumed silica nanoparticles may provide scattering centers for the light emerging from the fiber tip penetrating the gel, thereby improving back reflection when the fiber is disconnected from service. In other implementations, carbon nanotubes (or other such structures) can be added to the gel material. In still other implementations, metal (e.g., gold) nanoparticles (or other such structures) can be added to the gel material.

In certain implementations, the gel cleaning material 501 includes no more than 10% of the modifying material (e.g., silica) by weight. In certain implementations, the gel material includes no more than 6% of the modifying material by weight. In certain implementations, the gel material includes about 1% to about 6% of the modifying material by weight. In an example, the gel material includes about 3% of the modifying material by weight. In an example, the gel material includes about 1.5% of the modifying material by weight. In an example, the gel material includes about 4.5% of the modifying material by weight.

In other implementations, the cleaning material 501 can be an electrospun material that is deposited directly onto the shutter 74. Electrospinning is a process well known in the art that generally creates nanofibers through an electrically charged jet of polymer solution or polymer melt. The process of electrospinning results in the production of continuous fibers deposited as a non-woven fibrous mat or membrane by the application of an electric force. When the polymer concentration is high, fibers can form from the utilization of chain entanglement in polymer solutions or melts. In other words, electrospinning allows the fabrication of nanofibers from mixtures or solutions, which have great potential for fabrication of non-woven fiber mats. The materials to be electrospun will depend on the application.

The electrospun material may include nanofibers that have a diameter of between about 1-10 μm. In some implementations, the electrospun material may include polyurethane (PU). In certain implementations, the electrospun material may include a thermoplastic PU. In an example, the electrospun material includes a pure PU. In certain implementations, the electrospun material includes PU blended with Polyethylene terephthalate (PET). In an example, the electrospun material includes a blend of PU and a low amount of PET (e.g., PU:PET 3:1, PU:PET 6:1, etc.). In one embodiment, the electrospun material may be a contamination trapping barrier of nanofibers that have charged ions configured for cleaning surfaces of optical fibers.

In one embodiment, the electrospun material may be a contamination trapping barrier of nanofibers that have charged ions configured for cleaning surfaces of optical fibers. The electrospun material may include nanofibers that have a diameter of between about 1-10 μm. In one example, the electrospun material may include Polycaprolactone (PCL) solution. PCL is a semi-crystalline aliphatic polymer that can have a low glass transition temperature at 60° C., a melting temperature at about 60° C. In other examples, poly-L-lactide (PLLA) solution may be used to form the electrospun material. Due to the chiral nature of lactic acid, several distinct forms of polylactide exist (i.e., poly-L-lactide (PLLA) is the product resulting from polymerization of L,L-lactide (also known as L-lactide)). PLLA can have a crystallinity of about 37%, a glass transition temperature between about 55-65° C., a melting temperature between about 170-183° C. and a tensile modulus between about 2.7-16 GPa. PLLA can be quite stable under everyday conditions, although it may degrade slowly in humid environments at temperatures above its glass transition temperature. In still other examples, the electrospun material may include a mixture of both PCL and PLLA. It is to be understood that other polymers may be used, such as, but not limited to, poly(ethylene oxide) (PEO), or a mixture thereof with PU and/or PET.

In this example, the electrospun material incorporates positive surface charges for electrostatic interaction with negatively charged dust particles to clean an optical fiber. The thickness and/or density of the nanofibers in the electrospun material may determine the cleaning capability and puncturing force to push a fiber through a membrane of the electrospun material. It is to be understood that the fiber surface/density may vary between samples of the same polymer. In accordance with another aspect of the disclosure, the electrospun material may include apolar side chains on its surface for retaining oil micelles thereon.

In still other implementations, the cleaning material 501 includes a material arrangement including an electrospun fibrous material disposed over a flowable (e.g., viscoelastic) material. In certain implementations, the electrospun fibrous material can be disposed over a gel (e.g., a silicone gel, a thixotropic gel, etc.). In some such implementations, the fibrous material can retain the gel at the shutter 74. In an example, the fibrous material can inhibit the gel (e.g., a thixotropic gel) from remaining on the optical fiber (e.g., the end face) when the shutter 74 is opened. In other implementations, the viscoelastic material (e.g., silicone gel) is configured to recover when the shutter 74 is opened even without a fibrous material overlay.

In some implementations, a scaffold of fibers can be deposited over the viscoelastic gel or other flowable material using an electrospinning process. In an example, the scaffold is spun directly over the gel after the gel is deposited in the receptacle 500 of the shutter 74. In another example, the scaffold is spun onto a substrate and subsequently positioned over the gel. Additional information regarding electrospun membranes can be found in U.S. Provisional Application No. 61/758,150, filed Jan. 29, 2013, and titled "Optical Fiber Connection System Including Optical Fiber Alignment Device with Optical Fiber Cleaner," the disclosure of which is hereby incorporated herein by reference.

In certain implementations, the scaffold of electrospun fibers can inhibit contamination of the optical fiber (or a ferrule holding the optical fiber) by inhibiting direct contact between the gel and the optical fiber/ferrule. In certain implementations, the scaffold of fibers traps debris or other contaminants in the voids between the electrospun fibers, thereby removing the contaminants from the optical fiber/ferrule. In certain implementations, the optical fiber/ferrule contacts the gel when the gel is compressed through voids in the scaffold fibers. In certain implementations, the electrospun fibers can be impregnated with the gel material to provide hydrophobic properties or other desirable properties to the electrospun fibers.

When the shutter 74 is moved to the closed position, the end of the ferrule-less end portion 100' of the optical fiber 100 penetrates into the cleaning material 501. As the end portion 100' of the optical fiber penetrates the cleaning material 501, the cleaning material 501 can perform a cleaning action to remove dust or other debris that may have collected on the end face of the end portion 100'. In one example, the end portion 100' is a bare glass portion having a cladding with an outer diameter in the range of 120-130 microns and a core having an outer diameter in the range of 5-15 microns. In other embodiments, the end portion of the optical fiber can be supported by a ferrule and an end face of the ferrule or a portion of the fiber that protrudes beyond the ferrule end face can be covered by the cleaning material 501.

In certain implementations, the ferrule-less end portion 100' of the optical fiber 100 is embedded in the cleaning material 501 (e.g., a gel material) after penetration. In such implementations, the cleaning material 501 is capable of flowing to receive the end portion 100' and flows around the end portion 100' such that an end face of the end portion 100' is completely encapsulated by the cleaning material 501. In this way, the material 501 protects the end face from contamination and/or damage.

In one example, compressive load is required to force the end portion 100' into the cleaning material 501 and the end portion 100' buckles slightly within the buckling region 190 during the insertion/embedding process. In certain examples, the end portion 100' remains buckled within the buckling region 190 after the distal-most end of the end portion 100' has been fully embedded in the cleaning material 501 such that a compressive load remains on the end portion 100' after full insertion of the end portion 100' into the cleaning material 501. Because the shutter 74 is latched closed, the operator cannot open the shutter between uses. In this way, the useful life of the cleaning material 501 can be extended/preserved. Also, the latch prevents the shutter from opening in response to the compressive load on the ferrule-less end portion 100' of the optical fiber 100.

When the shutter 74 is moved from the closed position to the open position, the ferrule-less end portion 100' of the optical fiber 100 is withdrawn from the cleaning material 501. In certain implementations, the cleaning material 501 includes a flowable (e.g., viscoelastic) gel having non-stick adhesive properties such that no residue remains on the end face of the ferrule-less end portion 100' after the distal-most end of the ferrule-less end portion 100' has been withdrawn from the cleaning material 501. In certain implementations, the material 501 includes an electrospun material that recovers its original shape (e.g., due to the elasticity of the fibers), thereby allowing for reuse of the cleaning material 501.

Figure 11:
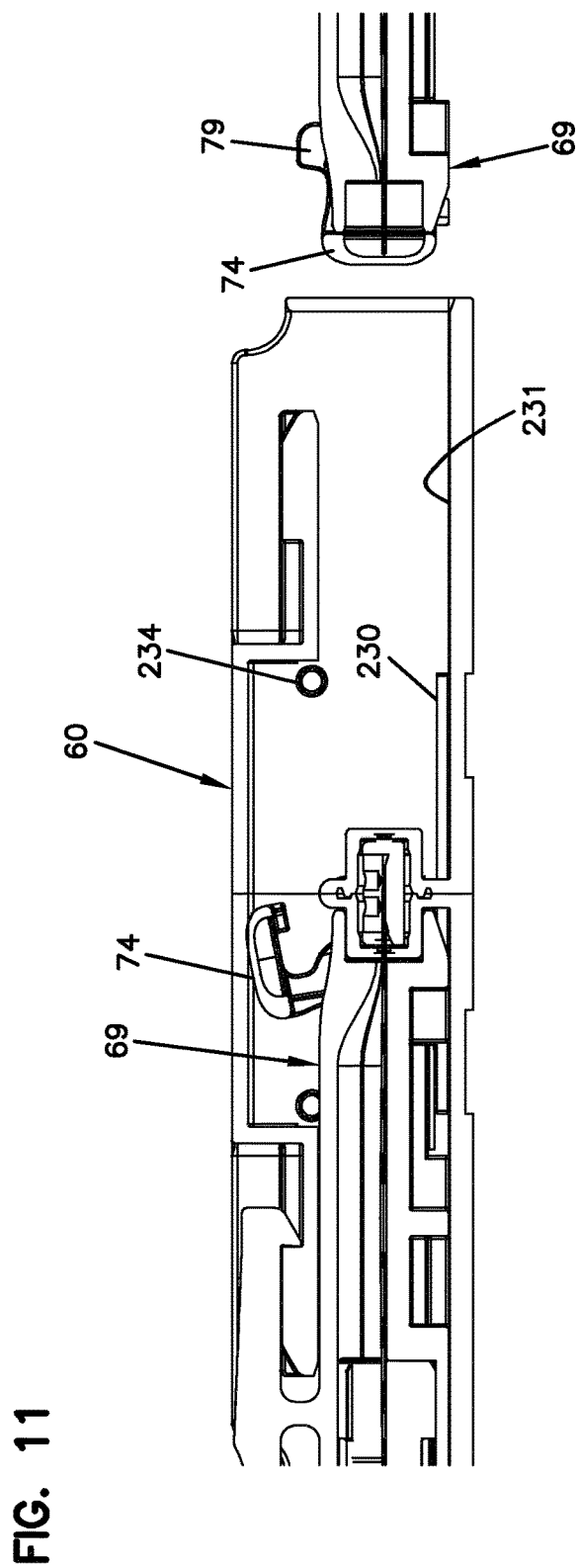
FIG. 11 shows the fiber optic adapter of FIG. 1 with a first fiber optic connector loaded in the left port and second fiber optic connector aligned with the right port.
Figure 17:
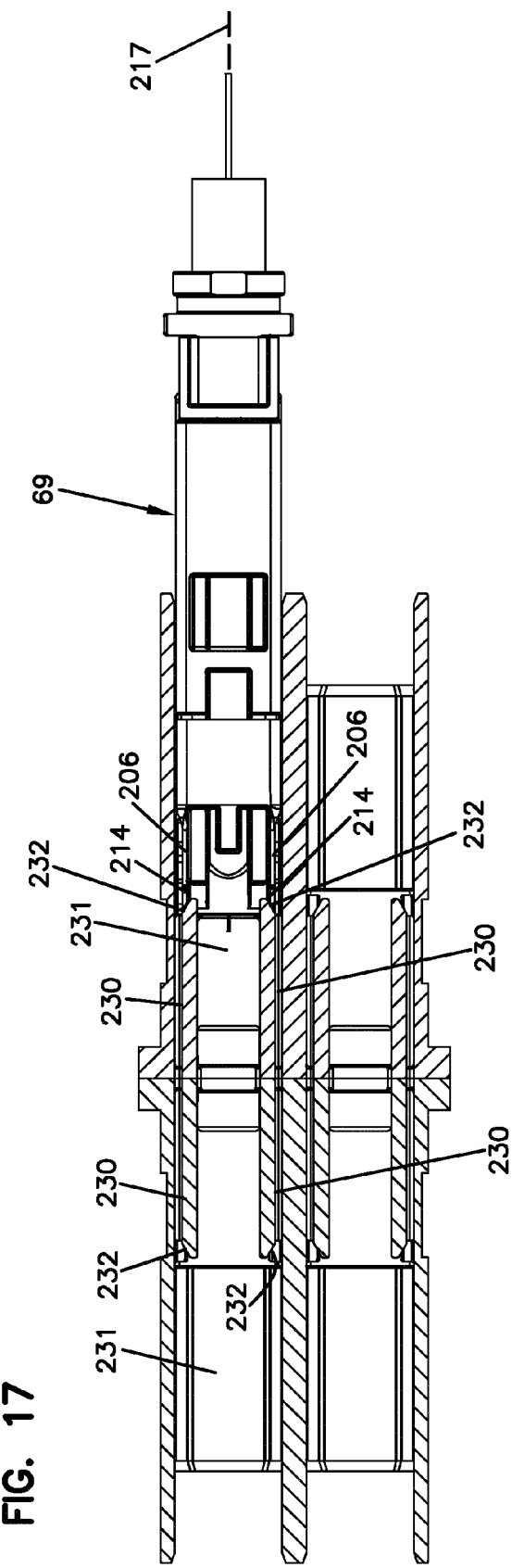
FIG. 17 is a cross-sectional view of a duplex fiber optic adapter with the second fiber optic connector inserted into the right port of the fiber optic adapter to a point where the shutter latch mechanism of the second fiber optic connector is initially engaging release rails of the fiber optic adapter and the shutter latch mechanism still in the latching position of FIG. 8.
Figure 18:
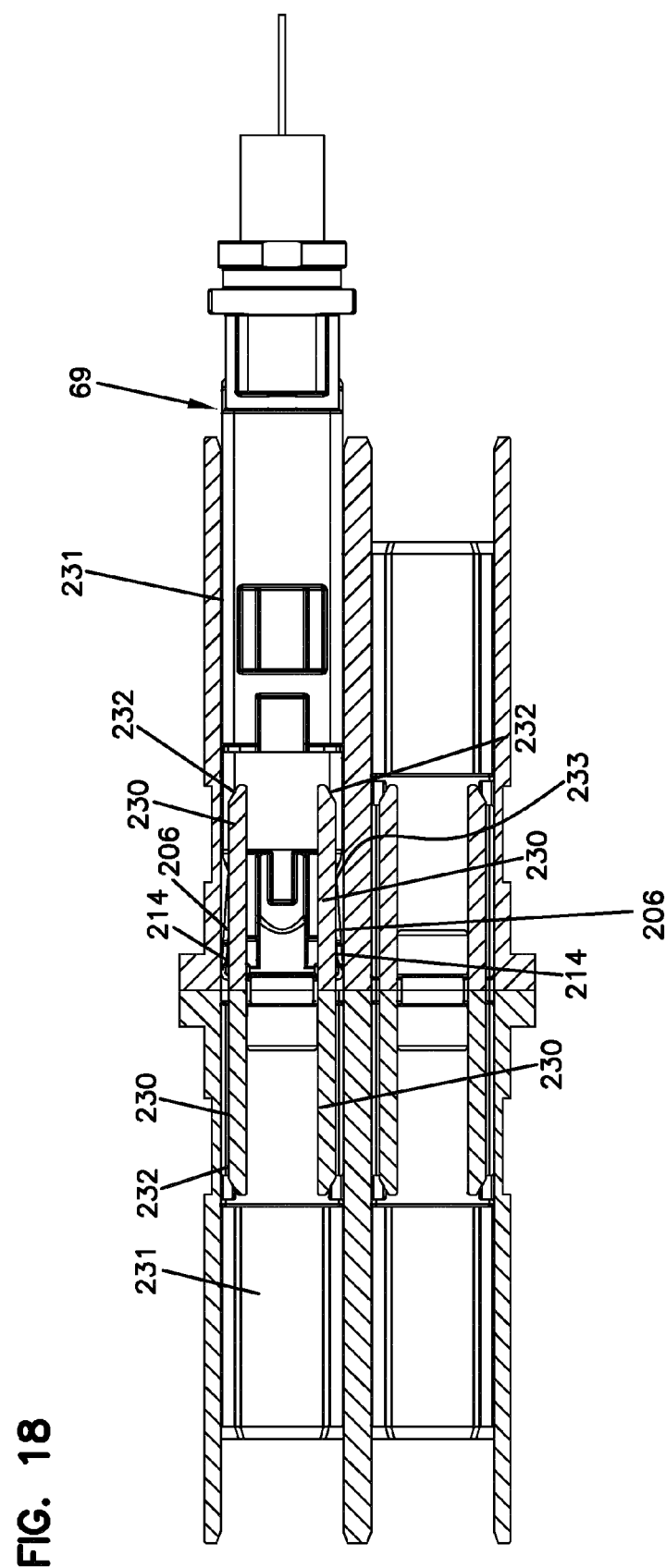
FIG. 18 is a cross-sectional view of the duplex fiber optic adapter of FIG. 17 with the second fiber optic connector inserted into the right port of the fiber optic adapter to a point where the shutter latch mechanism of the second fiber optic connector is engaging release rails of the fiber optic adapter and the release rails are holding the shutter latch mechanism in the release position of FIG. 9.

Fiber optic adapters in accordance with the principles of the present disclosure can include structure for consecutively moving the latching arms 206 from the latching position to the release position and then moving the shutter 74 from the closed position to the open position as the connector 69 is inserted into the fiber optic adapter. The structure can also move the shutter 74 from the open position to the closed position and then allow the latching arms to move from the release position to the latching position as the connector 69 is withdrawn from the adapter. As shown at FIGS. 11, 17 and 18, the fiber optic adapter 60 includes a pair of release rails 230 corresponding to each adapter port 231. The release rails 230 are parallel and have ramp surfaces 232 at their outer ends. The release rails 230 are parallel to the direction of insertion of the connector 69 within the adapter port 231 and the ramp surfaces 232 angle laterally outwardly as the ramp surfaces 232 extend in the connector insertion direction. The ramp surfaces 232 face generally away from one another and away from the central vertical reference plane 217 that longitudinally bisects the connector body 122. The fiber optic adapter 60 also includes shutter actuation posts 234 corresponding to the adapter ports 231. The release rails 230 are positioned adjacent bottom sides of the adapter ports 231 and the actuation posts 234 are positioned adjacent top sides of the adapter ports 231.

When one of the connectors 69 is inserted into one of the adapter ports 231, the ramp surfaces 216 of the latching arms 206 approach the ramp surfaces 232 of the release rails 230 (see FIG. 17). Continued insertion of the connector 69 into the adapter port 231 brings the ramp surfaces 216, 232 into contact with one another and the ramp surfaces 216 ride over the ramp surfaces 232. As the ramp surfaces 216 ride over the ramp surface 232, the latching arms 206 are forced to flex laterally outwardly from the latching position of FIG. 8 to the release position of FIG. 9. Once the ramp surfaces 216 move past the ramp surfaces 232, the release tabs 214 ride on outer sides 233 of the release rails 230 as the connector is continued to be inserted into the adapter port 231. Thus, once the connector is inserted so that the ramp surfaces 216 of the latching arms 206 have moved past the ramp surfaces 232 of the release rails 230, the outer sides 233 of the release rails 230 function to retain/hold the latching arms 206 in the release position through continued engagement with the release tabs 214.

The shutter actuation posts 234, the ramp surfaces 232 of the rails 230, the ramp surfaces 216 of the latching arms 206 and the lever portions 79 of the shutters 74 are all relatively positioned such that, during connector insertion, the lever portion 79 of the shutter 74 contacts the shutter actuation post 234 after the ramp surfaces 216 of the latching arms 206 have ridden over the ramp surfaces 232 of the release rails 230. Thus, the relative positioning ensures that the latching arms 206 have been moved to the release position prior to the lever portion 79 of the shutter 74 engaging the shutter actuation post 234. Contact between the shutter actuation post 234 and the lever portion 79 of the shutter 74 as the connector 69 is inserted into the adapter port 64 causes the shutter 74 to pivot about the pivot axis 73 from the closed position to the open position. Since the latching arms 206 had previously been moved to the release position as described above, the latching arms 206 do not interfere with movement of the shutter 74.

Figure 12:
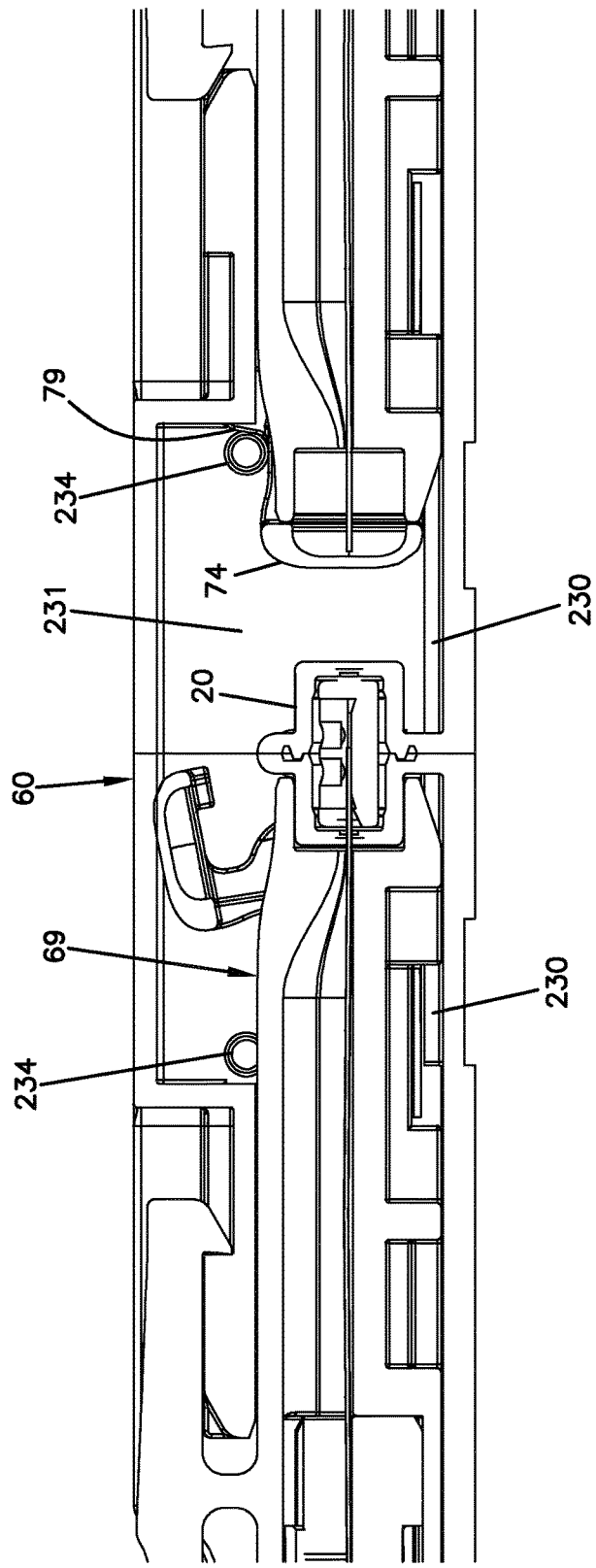
FIG. 12 shows the fiber optic adapter of FIG. 11 with the second fiber optic connector inserted to a position where the shutter latch mechanism has been moved to a release position.
Figure 13:
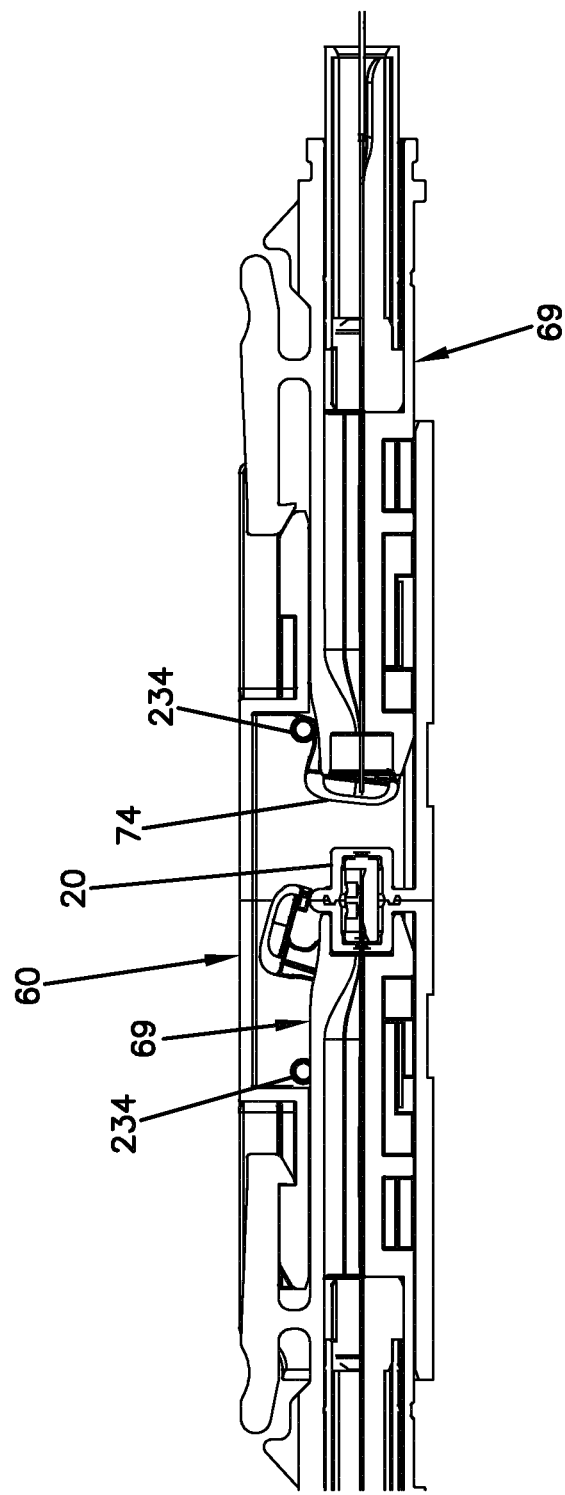
FIG. 13 shows the fiber optic adapter of FIG. 12 with the second fiber optic connector inserted to a position where the shutter has pivoted partially from the closed position toward the open position through contact with a shutter actuation post within the right port of the fiber optic adapter.
Figure 14:
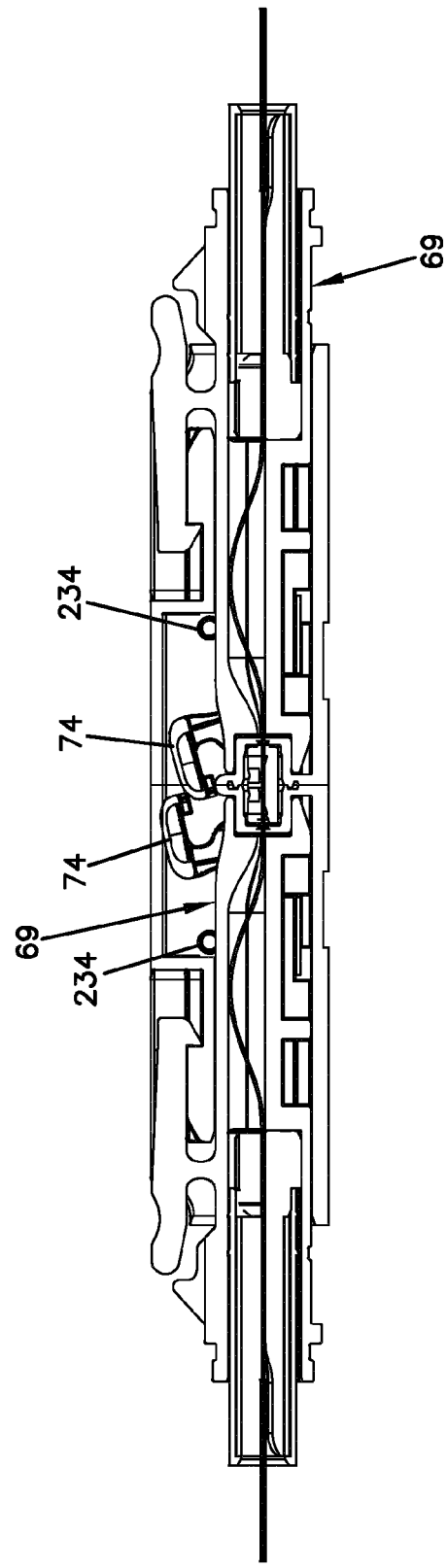
FIG. 14 shows the fiber optic adapter of FIG. 13 with the first and second fiber optic connectors fully loaded and secured in the fiber optic adapter and with optical fibers of the first and second fiber optic connectors co-axially aligned by an alignment device within the fiber optic adapter.

FIG. 11 shows the fiber optic adapter 60 with a left connector 69 already loaded in the left adapter port 231 and a right connector 69 ready to be inserted into the right connector port 231. FIG. 12 shows the fiber optic adapter 60 of FIG. 11 with the right connector 69 inserted to a position with the right adapter port 231 where the ramp surfaces 216 of the latching arms 206 are engaging the ramp surfaces 232 of the release rails 230 such that the latching arms 206 are in the process of moving from the latching position to the release position. FIG. 13 shows the fiber optic adapter 60 of FIG. 11 with the right connector 69 inserted to a position within the right adapter port 231 where the latching arms 206 are in the released position and the lever portion 79 of the shutter 74 is contacting the shutter actuation post 234 thereby causing the shutter 74 to pivot from the closed position toward the open position as the connector 69 is inserted further into the adapter port 231. FIG. 14 shows the fiber optic adapter 60 of FIG. 11 with the shutter in the open position and the connector fully inserted into the fiber optic adapter 60 such that the ferrule-less end portions 100' of the left and right connectors 69 are abutting one another and are being held in co-axial alignment by the alignment device 20.

Figure 15:
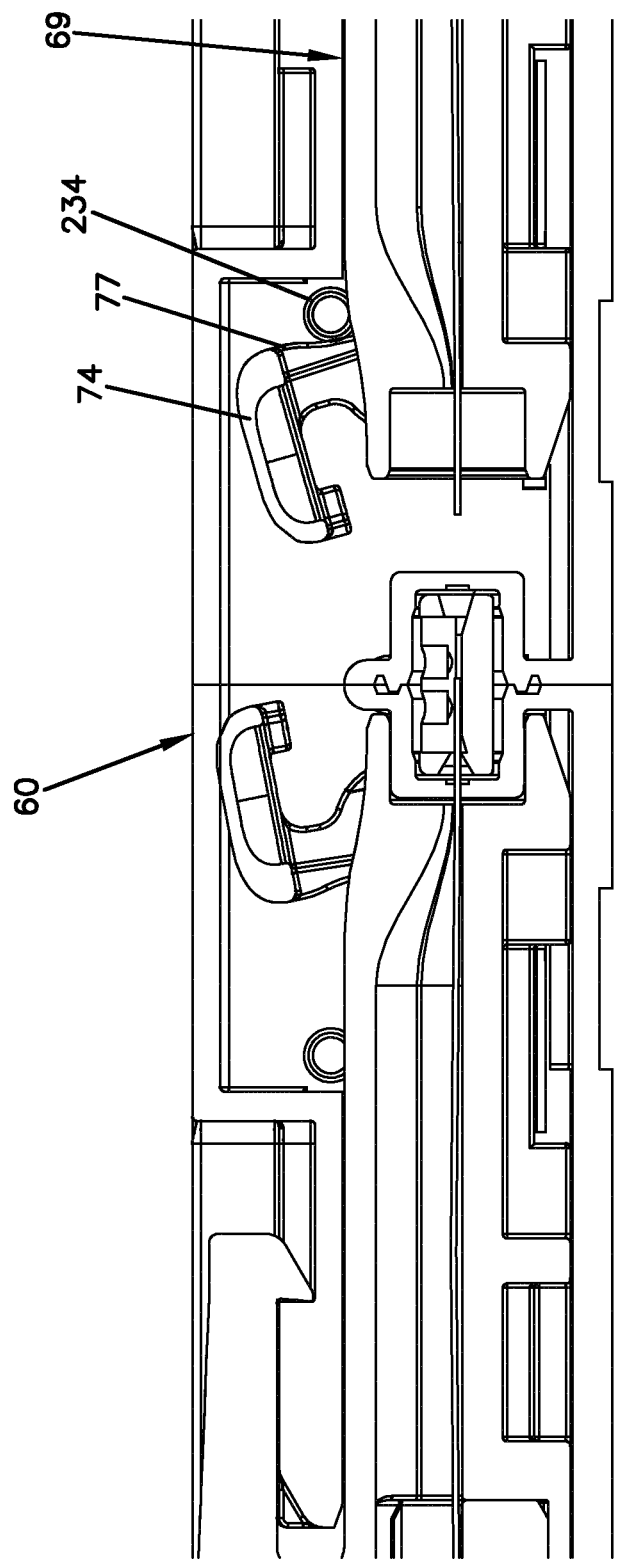
FIG. 15 shows the fiber optic adapter of FIG. 14 with the second fiber optic connector partially withdrawn from the right port of the fiber optic adapter and with the shutter of the second fiber optic connector contacting a shutter actuation post within the right port of the fiber optic adapter.
Figure 16:
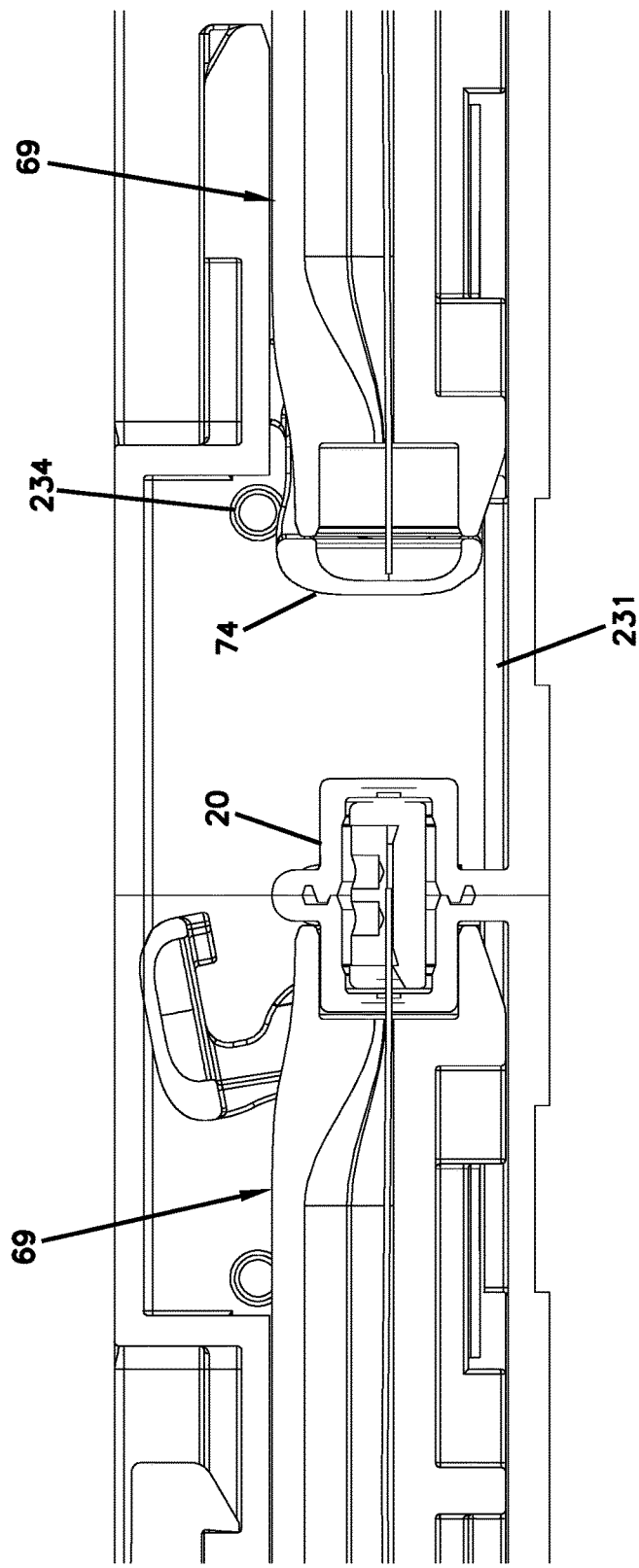
FIG. 16 shows the fiber optic adapter of FIG. 15 with the shutter pivoted to the closed position through contact with the shutter actuation post.

When the right connector 69 is withdrawn from the right adapter port 231 of the fiber optic adapter 60, the top portion 77 of the shutter 74 contacts the shutter actuation post 234 causing the shutter 74 to pivot from the open position to the closed position (see FIGS. 15 and 16). Thereafter, the ramp surfaces 216 of latching arms 206 slide back past the ramp surfaces 232 of the release rails 230. When this occurs, the inherent resiliency/elasticity of the latching arms 206 causes the latching arms to move from the release position back to the latching position. Thus, the latching arms 206 are spring biased toward the latching position. As the latching arms 206 move to the latching position, the end hooks 216 fit within the receptacles 222 of the closed shutter 74 thereby latching the shutter 74 in the closed position. Thus, the shutter 74 is latched in the closed position prior to full withdrawal of the right connector 69 from the right port 231 of the fiber optic adapter 60.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 20 alignment device
22 insertion axis
40, 41 balls
44, 45 springs
60 fiber optic adapter
64 simplex fiber optic adapter
69 fiber optic connectors
70 latches
71 catches
73 pivot axis
74 shutters
75 front cover portion
77 top portion
79 lever portion
100 optical fiber
100' ferrule-less free end portion
102 optical fiber
111 bare glass portion
112 fiber optic cable
113 coating layer
116 outer jacket
117 buffer tube
118 strength layer
119 fiber securement substrate
121 shape recoverable article
122 main connector body
123 front retention structure
124 front mating end
126 rear cable terminating end 130 rear insert
190 fiber buckling region
200 latching mechanism
202 latching clip
204 main body
206 latching arms
208 base
210 side walls
212 openings
214 release tabs
216 ramp surfaces
217 reference plane
218 end hooks
220 side tabs
222 receptacles
230 release rails
231 adapter port
232 ramp surfaces
233 outer sides
234 shutter actuation posts
500 receptacle
501 cleaning material

What is claimed is:

1. A fiber optic connector comprising:
a connector body disposed about an optical fiber having an end face;
a shutter mounted at a front end of the connector body, the shutter being moveable relative to the connector body between an open position and a closed position, the shutter covering the end face of the optical fiber when disposed in the closed position; and
a cleaning material disposed at an inner side of the shutter, the cleaning material including a gel, the cleaning material being configured to contact the end face of the optical fiber when the shutter is disposed in the closed position;
wherein the optical fiber includes a ferrule-less end portion having a distal-most end at which the end face is located; and
wherein the connector body defines a buckling region, and wherein the ferrule-less end portion bends within the buckling region when the shutter is in the closed position.

2. The fiber optic connector of claim 1 wherein the ferrule-less end portion of the optical fiber is formed by a bare-glass portion of the optical fiber.

3. The fiber optic connector of claim 1 further comprising a latch for positively latching the shutter in the closed position.

4. The fiber optic connector of claim 1, wherein the gel is mixed with nanoparticles, nanobeads, nanotubes, or quantum dots of a modifying material.

5. The fiber optic connector of claim 4, wherein the modifying material includes fumed silica.

6. The fiber optic connector of claim 4, wherein the modifying material includes carbon.

7. The fiber optic connector of claim 4, wherein the modifying material includes a metal.

8. The fiber optic connector of claim 7, wherein the modifying material includes gold.

9. The fiber optic connector of claim 1, wherein the cleaning material is configured to inhibit contamination of the end face of the optical fiber.

10. The fiber optic connector of claim 1, wherein the cleaning material is configured to clean the end face of the optical fiber.

11. The fiber optic connector of claim 1, wherein the cleaning material is configured to inhibit damage to the end face of the optical fiber.

12. The fiber optic connector of claim 1, wherein the cleaning material inhibits infrared light emitted from the end face of the optical fiber from shining through the shutter.

13. The fiber optic connector of claim 1, wherein the cleaning material includes a membrane of electrospun fibers.

14. The fiber optic connector of claim 13, wherein the gel includes a thixotropic gel; and wherein the electrospun fibers form a scaffold over the thixotropic gel.

15. A method of maintaining cleanliness of an optical fiber end face prior to connection of the optical fiber, the method comprising:
cleaning an end face of an optical fiber coupled to an optical fiber connector;
moving a shutter of the optical fiber connector to a closed position so that a portion of the shutter extends across the end face of the optical fiber and a gel cleaning material comprising a membrane of electrospun fibers disposed on an inner surface of the shutter contacts the end face; and
maintaining contact between the cleaning material and the end face of the optical fiber by maintaining the shutter in the closed position.

16. The method of claim 15, further comprising cleaning the end face of the optical fiber when the end face of the optical fiber contacts the gel cleaning material.

17. The method of claim 15, further comprising inhibiting light emitted from the end face of the optical fiber from shining outwardly from the optical fiber connector when the shutter is moved to the closed position.

18. The method of claim 15, further comprising
moving the shutter to an open position to expose the end face of the optical fiber; and
aligning the end face of the optical fiber with an end face of another optical fiber to make a connection between the optical fibers.

19. A fiber optic connector comprising:
a connector body disposed about an optical fiber having an end face;
a shutter mounted at a front end of the connector body, the shutter being moveable relative to the connector body between an open position and a closed position, the shutter covering the end face of the optical fiber when disposed in the closed position; and
a cleaning material disposed at an inner side of the shutter, the cleaning material including a gel, the cleaning material being configured to contact the end face of the optical fiber when the shutter is disposed in the closed position;
wherein the gel is mixed with nanoparticles, nanobeads, nanotubes, or quantum dots of a modifying material.

20. The fiber optic connector of claim 19, wherein the modifying material includes fumed silica.

21. The fiber optic connector of claim 19, wherein the modifying material includes carbon.

22. The fiber optic connector of claim 19, wherein the modifying material includes a metal.

23. The fiber optic connector of claim 19, wherein the modifying material includes gold.

24. A fiber optic connector comprising:
a connector body disposed about an optical fiber having an end face;
a shutter mounted at a front end of the connector body, the shutter being moveable relative to the connector body between an open position and a closed position, the shutter covering the end face of the optical fiber when disposed in the closed position; and a cleaning material disposed at an inner side of the shutter, the cleaning material including a gel, the cleaning material being configured to contact the end face of the optical fiber when the shutter is disposed in the closed position; and wherein the cleaning material includes a membrane of electrospun fibers.

25. The fiber optic connector of claim 24, wherein the gel includes a thixotropic gel; and wherein the electrospun fibers form a scaffold over the thixotropic gel.

\* \* \* \* \*